United States Patent
Dellock et al.

(10) Patent No.: US 10,627,553 B2
(45) Date of Patent: Apr. 21, 2020

(54) VEHICLE LIGHT ASSEMBLIES

(71) Applicant: Ford Global Technologies, LLC, Dearborn, MI (US)

(72) Inventors: Paul Kenneth Dellock, Northville, MI (US); Richard Gall, Ann Arbor, MI (US); Aaron Bradley Johnson, Allen Park, MI (US); Stuart C. Salter, White Lake, MI (US); David Brian Glickman, Southfiled, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 15/871,394

(22) Filed: Jan. 15, 2018

(65) Prior Publication Data
US 2019/0219746 A1   Jul. 18, 2019

(51) Int. Cl.
| | |
|---|---|
| *B60Q 1/04* | (2006.01) |
| *G02B 5/18* | (2006.01) |
| *F21S 41/20* | (2018.01) |
| *G02B 5/02* | (2006.01) |
| *G02B 5/32* | (2006.01) |
| *G02B 5/20* | (2006.01) |
| *B32B 27/36* | (2006.01) |

(Continued)

(52) U.S. Cl.
CPC .............. *G02B 5/18* (2013.01); *B32B 27/365* (2013.01); *B60Q 1/00* (2013.01); *F21S 41/275* (2018.01); *F21S 41/285* (2018.01); *G02B 5/0252* (2013.01); *G02B 5/203* (2013.01); *G02B 5/32* (2013.01); *B29C 45/0062* (2013.01); *B29K 2669/00* (2013.01); *B32B 2255/26* (2013.01); *B32B 2369/00* (2013.01)

(58) Field of Classification Search
CPC ...... B60Q 1/2696; B60Q 1/30; B60Q 1/2619; B60Q 1/44; B60Q 1/50; B60Q 2400/30; B60Q 2400/50; B60Q 1/04; F21S 43/00; G02B 27/0103; G02B 19/0061; G02B 2027/011; G02B 2027/0123; G02B 27/0037; G02B 5/32; G02B 5/18; B60R 1/1207

See application file for complete search history.

(56) References Cited

U.S. PATENT DOCUMENTS 4,562,519 A * 12/1985 Deves ................. F21S 48/1258
362/308
5,161,040 A * 11/1992 Yokoyama ............... G02B 7/08
359/19

(Continued)

FOREIGN PATENT DOCUMENTS

| DE | 102013108888 A1 | 2/2015 |
|---|---|---|
| DE | 102014117883 A1 | 6/2016 |

(Continued)

*Primary Examiner* — William R Alexander
*Assistant Examiner* — Balram T Parbadia
(74) *Attorney, Agent, or Firm* — David Coppiellie; Price Heneveld LLP

(57) ABSTRACT

A vehicle light assembly includes a housing. A light source is positioned within the housing. A lens is coupled with the housing. The lens defines a first surface and a second surface. A plurality of optical gratings is integrally defined in at least one of the first and second surfaces. The plurality of optical gratings is arranged in a spaced apart configuration.

20 Claims, 5 Drawing Sheets

(51) Int. Cl.
*F21S 41/275* (2018.01)
*B60Q 1/00* (2006.01)
B29C 45/00 (2006.01)
B29K 669/00 (2006.01)

(56) References Cited

U.S. PATENT DOCUMENTS

| | | | |
|---|---|---|---|
| 5,475,512 A | 12/1995 | Nakazawa et al. | |
| 7,864,427 B2* | 1/2011 | Korenaga | B29C 45/0053 |
| | | | 264/1.31 |
| 8,506,144 B2 | 8/2013 | Wang et al. | |
| 2002/0131175 A1* | 9/2002 | Yagi | G02B 27/0037 |
| | | | 359/569 |
| 2005/0036204 A1* | 2/2005 | Okamura | G02B 27/0037 |
| | | | 359/569 |
| 2005/0052742 A1* | 3/2005 | Brinkmann | F21V 5/002 |
| | | | 359/558 |
| 2005/0243423 A1* | 11/2005 | Nakai | G02B 27/0037 |
| | | | 359/566 |
| 2005/0254254 A1* | 11/2005 | Moseler | C03B 11/08 |
| | | | 362/520 |
| 2009/0067057 A1* | 3/2009 | Sprague | G02B 27/0101 |
| | | | 359/630 |
| 2009/0180186 A1* | 7/2009 | Ando | B29C 39/025 |
| | | | 359/566 |
| 2009/0182690 A1* | 7/2009 | Stein | G01J 1/04 |
| | | | 706/12 |
| 2009/0310377 A1* | 12/2009 | Kanai | F21V 5/002 |
| | | | 362/538 |
| 2010/0134888 A1* | 6/2010 | Korenaga | B29C 45/0053 |
| | | | 359/576 |
| 2010/0165429 A1 | 7/2010 | Buckley et al. | |
| 2010/0172146 A1* | 7/2010 | Fischer | F21S 41/275 |
| | | | 362/520 |
| 2011/0096400 A1* | 4/2011 | Ando | G02B 5/1895 |
| | | | 359/570 |
| 2014/0029287 A1* | 1/2014 | Anzai | G02B 27/0037 |
| | | | 362/521 |
| 2014/0049983 A1* | 2/2014 | Nichol | G02B 6/0018 |
| | | | 362/610 |
| 2015/0182759 A1* | 7/2015 | Baek | A61N 5/0618 |
| | | | 359/566 |
| 2018/0013986 A1* | 1/2018 | Chien | F21V 29/00 |
| 2018/0173009 A1* | 6/2018 | Knox | G02B 5/1814 |

FOREIGN PATENT DOCUMENTS

| | | |
|---|---|---|
| DE | 102014119326 A1 | 6/2016 |
| WO | 2016131673 A1 | 9/2013 |

\* cited by examiner

VEHICLE LIGHT ASSEMBLIES

FIELD OF THE INVENTION

The present disclosure generally relates to light assemblies, and more particularly to vehicle light assemblies.

BACKGROUND OF THE INVENTION

Vehicles incorporate a variety of light assemblies positioned around the vehicle. Conventional light assemblies only offer utilitarian functionality. Accordingly, new light assemblies offering aesthetic features may be advantageous.

SUMMARY OF THE INVENTION

According to one feature of the present disclosure, a vehicle light assembly includes a housing. A light source is positioned within the housing. A lens is coupled with the housing. The lens defines a first surface and a second surface. An optical grating is integrally defined in at least one of the first and second surfaces.

According to another feature of the present disclosure, a vehicle headlight assembly includes a housing. A headlamp light source is positioned within the housing. A substantially transparent lens is coupled with the housing extending over the light source. The lens defines an interior surface and an exterior surface. An optical grating includes at least one of a diffraction grating and a holographic grating integrally defined in the interior surface.

According to yet another feature of the present disclosure, a method of producing a vehicle light assembly includes the steps: forming a housing; injection molding a substantially transparent polymer into a mold defining an optical grating feature; solidifying the polymer in the optical grating feature to form a lens defining an optical grating on a surface; and coupling the lens to the housing.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1A:
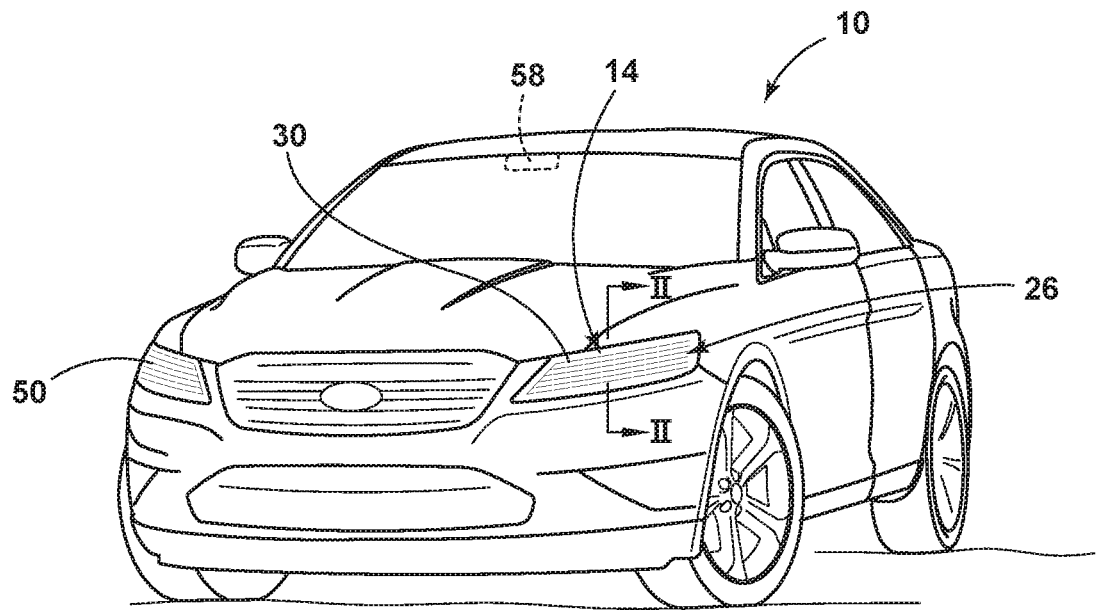
FIG. 1A is a front perspective view of a vehicle, according to at least one example.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Figure 1B:
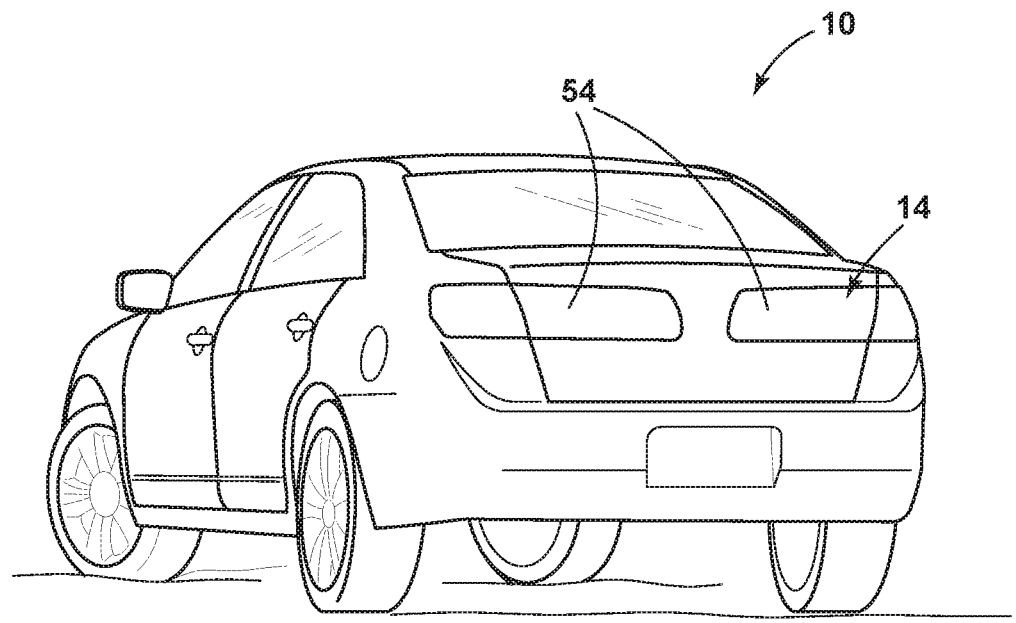
FIG. 1B is a rear perspective view of the vehicle, according to at least one example.
Figure 2:
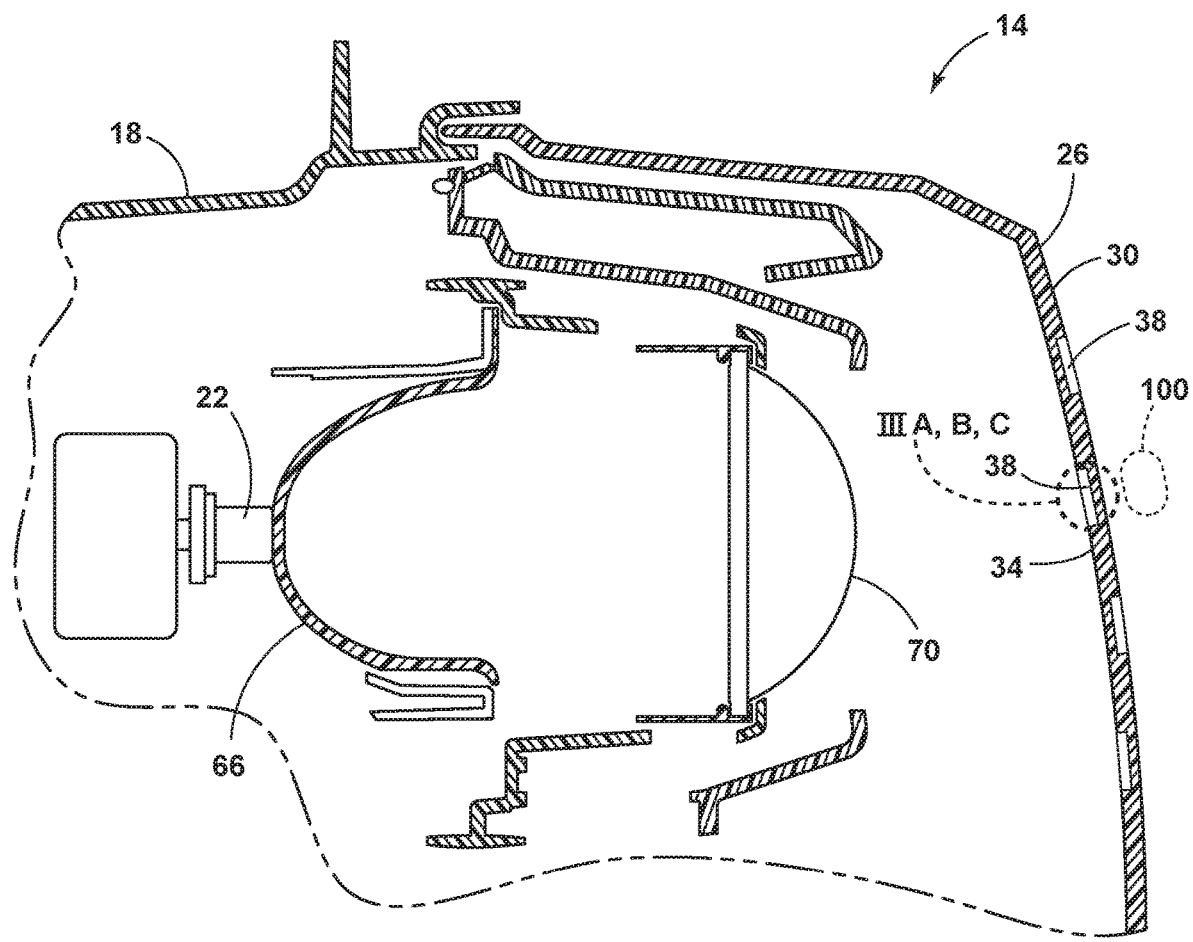
FIG. 2 is a cross-sectional view of a light assembly taken at line II of FIG. 1A, according to at least one example.

Referring now to FIGS. 1A-2, depicted is a vehicle 10. The vehicle 10 may include one or more light assemblies 14 positioned around the vehicle 10. As such, the light assembly 14 may be referred to as a vehicle light assembly 14. The light assembly 14 may include a housing 18 and a light source 22 positioned within the housing 18. A lens 26 is coupled with the housing 18. The lens 26 may define a first surface 30 and a second surface 34. In the depicted examples, the first surface 30 may be an exterior surface and the second surface 34 may be an interior surface. It will be understood that in other examples the first surface 30 may be an interior surface and the second surface 34 may be an exterior surface. An optical grating 38 may be integrally defined in at least one of the first and second surfaces 30, 34.

Referring now to FIGS. 1A and 1B, the vehicle 10 is depicted as a car, but it will be understood that the vehicle 10 may be a truck, van, motorcycle, sport-utility vehicle and/or cross-over. The vehicle 10 includes a plurality of light assemblies 14 which are positioned around the vehicle 10. For example, the light assembly 14 may be a headlight 50, a taillight 54, a day light running lamps, a center high mount stop light, an interior light 58 and or other light assemblies 14 positioned around the vehicle 10.

Referring to FIG. 2, the vehicle light assembly 14 is shown having the housing 18 and the lens 26 connected to the housing 18. The housing 18 is generally fixed to the vehicle body in a conventional manner and/or the housing 18 may be a component of the body of the vehicle 10. The housing 18 may be composed of a metal, ceramic, polymer, composite material and/or combinations thereof. According to various examples, the housing 18 may be composed of a polymeric material. The polymeric material of the housing 18 may be composed of low-density polyethylene, high-density polyethylene, polypropylene, polyvinyl chloride, polystyrene, nylon, teflon, thermoplastic polyurethanes, polycarbonate, silicone, other polymeric materials and/or combinations thereof. The housing 18 may include one or more attachment features (i.e., either integrally defined or mechanically coupled to) to couple the housing 18 with the body of the vehicle 10.

Disposed within the housing 18 and outer lens 26 is the light source 22, a reflector 66, and an inner lens 70. The light source 22 may include one or more light emitting diodes (LEDs), incandescent bulbs, halogen bulbs, projector light sources and/or other sources of light illumination. The reflector 66 is generally positioned to reflect light output from the light source 22 forward of the vehicle 10 through the inner lens 70 and lens 26 to illuminate a roadway generally forward of the vehicle 10. In other words, the light source 22 projects light through the second surface 34, through the lens 26 and through the first surface 30 to an exterior of the vehicle 10. The inner lens 70 may be made of a clear light transmissive polymeric material. The light assembly 22 may be configured as a low beam light assembly, a high beam light assembly, or a combination of low and high light beam assemblies. Additionally, the housing 18 and lens 26 may contain a plurality of light sources 22 for multiple functions, such as headlight illumination, daylight running lamps, turn signals, flashers, and other lighting functions.

According to various examples, the lens 26 may be composed of a polymeric material. The polymeric material of the lens 26 may be composed of low-density polyethylene, high-density polyethylene, acrylic, polypropylene, polyvinyl chloride, polystyrene, nylon, teflon, thermoplastic polyurethanes, polycarbonate, silicone, other polymeric materials and/or combinations thereof. In some examples, the lens 26 may be composed of more than one material such that the lens 26 is layered or otherwise has a segmented structure. For example, the lens 26 may include one or more coatings (e.g., hard coatings, antireflection coating and/or decorative coatings). The lens 26 may be clear, dyed, tinted or otherwise colored to provide an aesthetically pleasing appearance. According to various examples, the lens 26 may be composed of an optically transparent polymeric material. For example, the lens 26 may be substantially transparent to the visible wavelengths of light (e.g., from about 400 nm to about 700 nm). In such examples, the lens 26 may be configured to transmit about 5% or greater, about 10% or greater, about 15% or greater, about 20% or greater, about 25% or greater, about 30% or greater, about 35% or greater, about 40% or greater, about 45% or greater, about 50% or greater, about 55% or greater, about 60% or greater, about 65% or greater, about 70% or greater, about 75% or greater, about 80% or greater, about 85% or greater, about 90% or greater, about 95% or greater, or about 99% of light of the visible wavelength band.

As explained above, the lens 26 defines the first surface 30 and the second surface 34. The first surface 30 may be an outboard, exterior, surface of the lens 26 while the second surface 34 may be an inboard, or interior, surface of the lens 26. In other words, the second surface 34 of the lens 26 is closer to the light source 22 than the first surface 30. The first and/or second surfaces 30, 34 of the lens 26 may be flat or may be curved. In some examples, portions of the first and/or second surfaces 30, 34 may be flat and other portions curved. The first and/or second surfaces 30, 34 of the lens 26 may define the optical gratings 38. As will be explained in greater detail below, the optical gratings 38 may be diffraction gratings, holographic gratings or combinations thereof. The optical gratings 38 may be integrally defined by the first and/or second surfaces 30, 34. The optical gratings 38 may themselves define one or more indicia, logos, images, alphanumeric text and combinations thereof to the shape of the optical gratings 38.

The optical gratings 38 may be at least one of a holographic grating and a diffraction grating. According to various examples, one or more of the optical gratings 38 may be a holographic grating. The gratings 38 may be formed by defining one or more features configured to form an interference pattern. The features of the optical grating 38 may be ridges, variations in opacity, density or surface profile. Ambient light from around the vehicle 10 and/or light assembly 14 falling on the optical grating 38 diffracts into a light field which forms a projected image 100. The projected image 100 may also be known as a hologram. The light field which forms the projected image 100 may exhibit visual depth queues such as parallax and perspective that change realistically with any change in the relative position of the observer (e.g., an occupant within an interior of the vehicle 10). As the projected image 100 exhibits a depth and changes with changing perspective of the observer, the projected image 100 is a hologram. The projected image 100 may appear to "float" or "hover" over the lens 26. In yet other examples, the projected image 100 may appear to be encased within the lens 26. The projected image 100 may take a variety of configurations including alpha numeric text, symbols (e.g., vehicle make or model symbols, star pattern, etc.), as well as pictures, logotypes and/or other indicia.

Figure 3A:
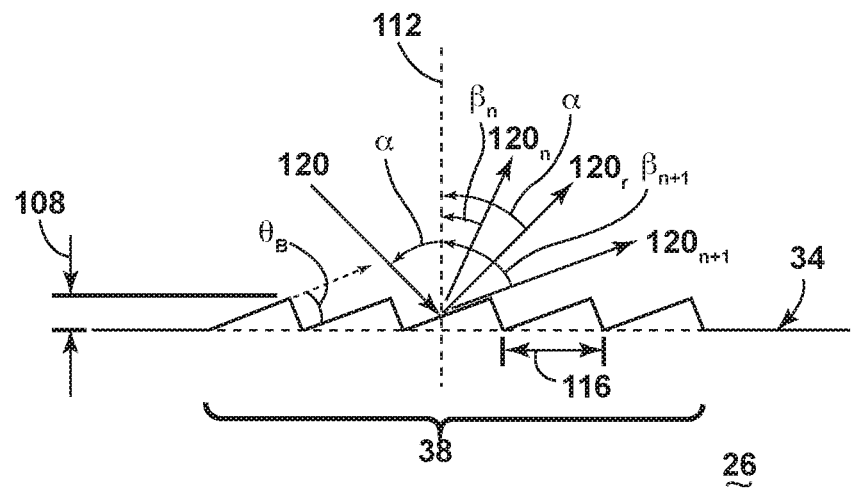
FIG. 3A is an enhanced view taken at section IIIA of FIG. 2, according to at least one example.
Figure 3B:
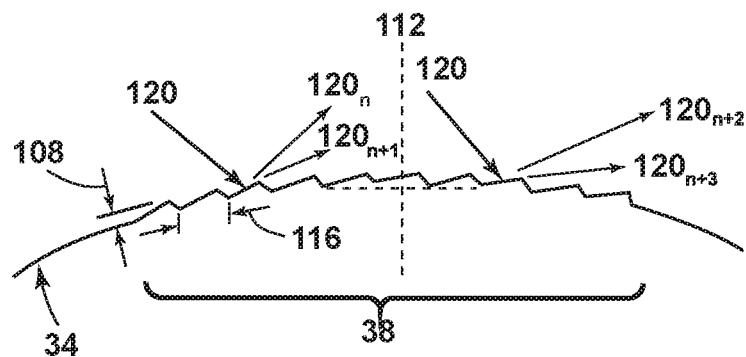
FIG. 3B is an enhanced view taken at section IIIB of FIG. 2, according to at least one example.

Referring now to FIGS. 3A and 3B, the optical grating 38 may be a diffraction grating configured to produce an iridescent pattern to light impinging upon it. As such, the optical grating 38 may be referred to as a diffraction grating 38. The diffraction grating 38 may be present on a flat example of the lens 26 (FIG. 3A) on a curved embodiment of the lens 26 (FIG. 3B), or on other shapes of the lens 26. For example, the diffraction grating 38 may be configured to reflect light of different wavelengths in different directions. The diffraction grating 38 may have a thickness 108 that ranges from about 250 nm to about 1000 nm. The thickness 108 of the diffraction grating 38, for example, should be maintained in the range of about 250 nm to about 1000 nm according to one embodiment to ensure that the portions of the lens 26 which include the diffraction gratings 38 exhibits a jewel-like appearance through light diffraction upon illumination in direct ambient lighting while also having a minimal effect on the optical clarity of the lens 26 under non-direct ambient lighting. The thickness 108 of the diffraction grating 38 may range from about 390 nm to 700 nm. In other examples, the thickness 108 of the diffraction gratings 38 ranges from about 500 nm to about 750 nm. As depicted in FIG. 3A in exemplary form, the diffraction grating 38 may have a sawtooth or triangular shape. In three dimensions, these gratings 38 can appear with a stepped or sawtooth shape without angular features, pyramidal in shape, or some combination of stepped and pyramidal shapes. Other shapes of the diffraction grating 38 include hill-shaped features (e.g., sinusoidal or curved shaped features). The diffraction grating 38 can also include portions with a combination of triangular and hill-shaped features. More generally, the shapes of the grating 38 should be such that an effective blazing angle $\theta_B$ of at least 15 degrees is present for one or more portions of each grating, tooth or groove of the diffraction grating 38. The blaze angle $\theta_B$ is the angle between step normal (i.e., the direction normal to each step or tooth of the grating 38) and a direction normal 112 to the first and/or second surfaces 30, 34 having the diffraction grating 38.

Generally, the blaze angle $\theta_B$ is optimized to maximize the efficiency of the wavelength(s) of the incident light which may be typical ambient sunlight to ensure that maximum optical power is concentrated in one or more diffraction orders while minimizing residual power in other orders (e.g., the zeroth order indicative of the ambient light itself). An advantage of situating the diffraction gratings 38 on planar portions or aspects of the first and/or second surfaces 30, 34 of the lens 26 is that a constant blaze angle $\theta_B$ and a period 116 will result in consistent reflected and diffracted light produced from the diffraction grating 38.

The diffraction grating 38 of the lens 26 may be characterized by one or more periods 116 (also known as d in the standard nomenclature of diffraction gratings). In most aspects of the lens 26, the period 116 of the diffraction grating 38 is maintained between about 50 nm and about 5 microns. In general, the maximum wavelength that a given diffraction grating 38 can diffract is equal to about twice the period 116. Hence, a diffraction grating 38 with the period 116 that is maintained between about 50 nm and about 5 microns can diffract light in an optical range of 100 nm to about 10 microns. In a specific example, the period 116 of the diffraction grating 38 is maintained from about 150 nm to about 400 nm, ensuring that the diffraction grating 38 can efficiently diffract light in an optical range of about 300 nm to about 800 nm, roughly covering the visible spectrum.

Incident light 120 (typically ambient sun light) at an incident angle $\alpha$ is directed against a sawtooth-shaped diffraction grating 38 having a thickness 108, a period 116 and a blaze angle $\theta_B$. More particularly, a portion of the incident light 120 (preferably, a small portion) striking the diffraction grating 38 at an incident angle $\alpha$ is reflected as reflected light 120r at the same angle $\alpha$, and the remaining portion of the incident light 120 is diffracted at particular wavelengths corresponding to diffracted light $120n$, $120n+1$, etc., at corresponding diffraction angles $\beta n$, $\beta n+1$, etc. The reflected light 120r is indicative of the zeroth order (i.e., n=0) and the diffracted light $120_n$, $120_{n+1}$, $120_{n+2}$ are indicative of the nth order diffraction according to standard diffraction grating terminology, where n is an integer corresponding to particular wavelengths of the reflected or diffracted light.

Figure 3C:
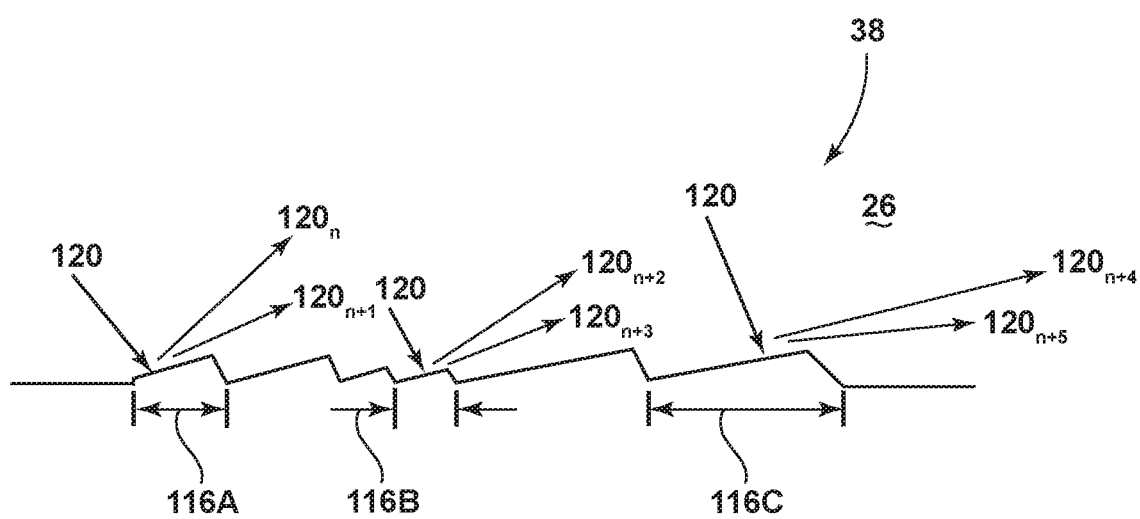
FIG. 3C is an enhanced view taken at section IIIC of FIG. 2, according to one example.

Referring now to FIG. 3C, an example of the diffraction grating 38 employing varying periods (e.g., as including a set of periods) that can be employed in iridescent examples of the optical grating 38 is depicted in a cross-sectional form. In the depicted example, the diffraction grating 38 can have two or more sets of teeth or grooves, each having a particular period 116 that can produce light at unique or differing diffraction orders. As shown, the grating 38 is configured with three periods—period 116A, period 116B, and period 116C. One set of teeth of the diffraction grating 38 with a period of 116A can produce diffracted light $120n$ and $120_{n+1}$, a different set of teeth with a period of 116B can produce diffracted light $120_{n+2}$ and $120_{n+3}$, and a third set of teeth with a period of 116C can produce diffracted light $120_{n+4}$ and $120_{n+5}$, all from the same incident light 120. Consequently, the diffraction grating 38, whether employed on first or second surfaces 30, 34 (FIG. 2) of the lens 26, advantageously can produce jewel-like effects of widely varying wavelengths within various regions of the lens 26. For example, the indicia, logos, etc. described above in connection with the shape of the optical gratings 38 may be produced with an iridescent appearance.

In some aspects, the diffraction grating 38 includes a varying period that varies between two to ten discrete values or, more preferably, between two to five discrete values across the diffraction grating 38. According to another aspect, the diffraction grating 38 with varying periods can be employed in one or more portions of the first and/or second surfaces 30, 34 of the lens 26, and one or more diffraction gratings 38 having a constant period are employed in other portions of the first and/or second surfaces 30, 34 of the lens 26 to create interesting, jewel-like appearance effects produced by the lens 26 employing the gratings 38. In another example, the diffraction grating 38 includes a varying period that changes between any number of values, only limited by the overall length of the grating 38 and/or the processing capabilities to develop such variability through precise control of mold dimensions. In another embodiment there may be a plurality of diffraction gratings 38 in a spaced apart configuration across the first and/or second surfaces 30, 34 of the lens 26. In such an example, the plurality of diffraction gratings 38 may have the same or a different period. In yet another example, the diffraction grating(s) 38 may substantially cover the first and/or second surfaces 30, 34 of the lens 26. In examples where diffraction gratings 38 are present on the second surface 34, the diffraction taking place on the second surface 34 may provide an aesthetically pleasing "depth" to the lens 26.

Figure 4:
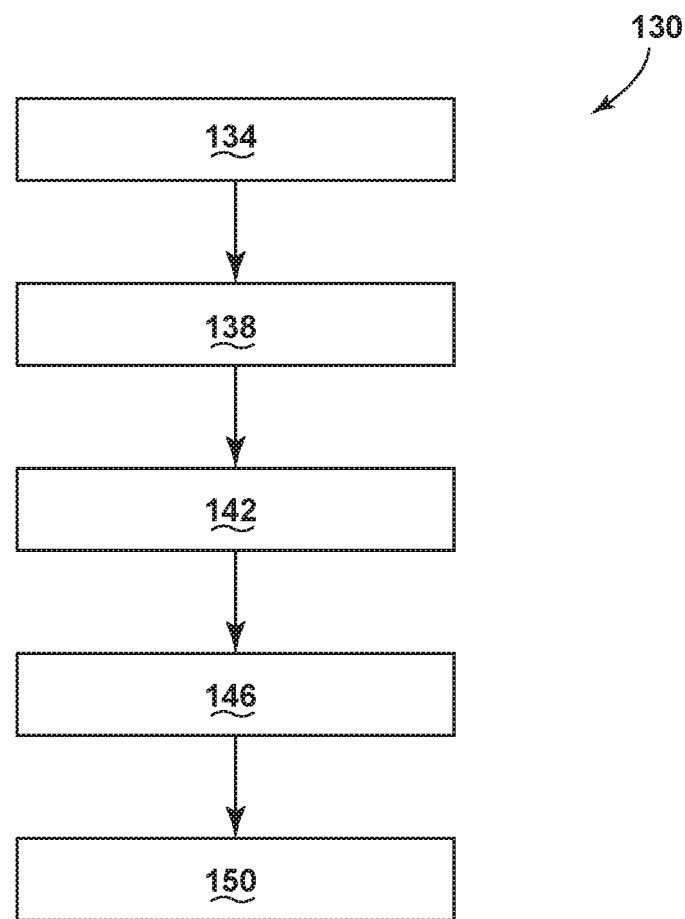
FIG. 4 is a flow diagram of a method, according to at least one example.

Referring now to FIG. 4, depicted is a method 130 of producing the light assembly 14. The method 130 may begin with a step 134 of forming the housing 18. In examples where the housing 18 is composed of a polymeric material, the step 134 may be forming the polymeric housing 18. The housing 18 may be formed though injection molding, compression molding, transfer molding, blow molding, extrusion, machining and/or other techniques known in the art.

Next, a step 138 of injection molding a substantially transparent polymer into a mold defining an optical grating feature may be performed. The mold may be composed of a metal such as steel, iron, aluminum, other metals and alloys thereof. The mold may define a cavity which generally has the shape of the lens 26. The substantially transparent polymer may be any of the materials described above in connection with the lens 26. The optical grating feature may be a plurality of grooves or features configured to create an imprint in the polymer to form the optical grating 38. The optical grating feature may include nanoscale optical details while maintaining pristine surface quality. Such an optical grating feature may be formed by using a short pulse femtosecond laser. Short pulse femtosecond lasers may include lasers which pulse infrared radiation (e.g., light having a wavelength of from about 700 nm to about 2700 nm) and/or ultraviolet light (e.g., light having a wavelength of about 400 nm or less) at a fast rate (e.g., as fast as $150 \times 10^{15}$ sec). Such a laser may allow for very high peak powers with "Low" per pulse energy for a small laser spot size. The laser ablates a small amounts of material at a time to form the optical grating feature. Use of such a laser may be advantageous in allowing the mold to be cold ablated with no pressure meaning there is virtually no heat affected zone created and little to no burrs. With this type of laser, features as thin as 100 nm thick with a Gaussian, square and/or triangular shape can be cut into the mold to create the optical grating feature. Using such a laser, the optical grating feature may be cut, or etched, with a ruled holographic or spaced holographic (sinusoidal) diffraction grating on the mold. In a specific example, the optical grating feature may have a ruled or holographic grating which is from about 400 nm to about 800 nm. This spacing refracts white light into the entire visible light spectrum. As such, the optical grating feature of the mold may be formed as a holographic grating or the optical grating feature of the mold may be formed as a diffraction grating.

During the method 130, and/or during the step 138, a step of heating the mold proximate the optical grating feature may be performed. Conventional plastics may not have the viscosity needed to fill the minute details of the optical grating feature that is laser machined into the mold. When most polymers are injected into a cold injection molding tool, the polymers will solidify before fully filling the minute details of the optical grating feature. To keep the viscosity of the polymer material low enough to fill the optical grating feature, the optical grating feature may be heated. The optical grating feature may be heated using resistance, steam, hot oil, induction or other methods capable of heating the mold proximate the optical grating feature.

Next, a step 142 of solidifying the polymer in the optical grating feature to form the lens 26 defining the optical grating 38 on a surface is performed. As the polymeric material within the mold cools, it solidifies to form the lens 26. In other words, because the cavity of the mold has the general shape of the lens 26, when the polymeric material within the mold solidifies the material takes the shape of the lens 26. The portion of the polymeric material which is within the groves or features of the optical grating feature solidify in the shape of the optical grating feature to form the optical grating 38. As such, the optical grating is integrally defined by the lens 26.

According to various examples, a step of forming the optical grating 38 as an indicia may be performed. It will be understood that the step may additionally or alternatively be performed in any one of the above noted steps (e.g., step 142). Indicia examples of the optical grating 38 may be formed as alphanumeric text, symbols, images, logotypes and/or other indicia. Such a feature may be advantageous in not only producing an aesthetically pleasing appearance (e.g., sparkles and/or the projected image) but may also convey information (e.g., manufacturer and/or model of the vehicle 10).

Next, a step 146 of coupling the lens 26 to the housing 18 is performed. The lens 26 may be bonded, coupled or otherwise adhered to the housing 18 through a variety of techniques including vibration welding, melting, mechanically coupling and/or other techniques. Further, before or after the lens 26 is coupled to the housing 18, a step of inserting a headlamp example of the light source 22 into the housing 18 may be performed. For example, the light source 22 may be inserted into the reflector 66.

It will be understood that although described in a particular order, any of the steps of the method 130 may be performed in any order. Further, one or more of the steps may be omitted or performed later without departing from the teachings provided herein.

Use of the present disclosure may offer a variety of advantages. First, use of the diffraction examples of the optical gratings 38 may allow the lens 26 to break apart white light like a prism, dispersing it into a rainbow of colors and sparkle and giving iridescence to the light assembly 14. Second, many appearances and unique imagery can be provided by changing the molded projected image 100 formed by the optical grating 38 and/or tinting the lens 26. Such a feature will allow the lens 26 convey unique appearances that will appear hidden at first glance and then glisten and/or from the projected image 100 upon closer inspection. Third, use of holographic grating examples of the optical grating 38 reduces the use of conventional technologies like holographic film which may add significant cost and may reduce the clarity of the lens 26.

According to various embodiments, a vehicle light assembly includes a housing, a light source positioned within the housing, a lens coupled with the housing. The lens defines a first surface and a second surface. An optical grating is integrally defined in at least one of the first and second surfaces. Embodiments of the vehicle light assembly can include any one or a combination of the following features:

the lens is substantially transparent to visible light;
the first surface is an exterior surface and the second surface is an interior surface;
the optical grating is integrally defined in the second surface;
the optical grating is integrally defined in the first surface;
the optical grating is at least one of a holographic grating and a diffraction grating;
the optical grating comprises a holographic grating;
the optical grating comprises a diffraction grating; and/or
the light source is a headlamp light source.

According to various embodiments, a method of producing a vehicle light assembly includes the steps: forming a housing; injection molding a substantially transparent polymer into a mold defining an optical grating feature; solidifying the polymer in the optical grating feature to form a lens defining an optical grating on a surface; and coupling the lens to the housing. Embodiments of the method can include any one or a combination of the following features:

forming the optical grating feature of the mold as a diffraction grating;
forming the optical grating feature using a femtosecond laser;
forming the optical grating as an indicia; and/or
heating the mold proximate the optical grating feature.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

What is claimed is:

1. A vehicle light assembly, comprising:
a housing;
a light source positioned within the housing;
a lens coupled with the housing, wherein the lens defines a first surface and a second surface; and
a first plurality of optical gratings having different periods integrally defined in the first surface; and
a second plurality of optical gratings having different periods integrally defined in the second surface, wherein each of the first and second pluralities of optical gratings are arranged in a spaced apart configuration across the first and second surfaces, and wherein the first plurality of optical gratings are laterally offset from the second plurality of optical gratings with respect to an optical axis.

2. The vehicle light assembly of claim 1, wherein the lens is substantially transparent to visible light.

3. The vehicle light assembly of claim 1, wherein the first surface is an exterior surface and the second surface is an interior surface.

4. The vehicle light assembly of claim 3, wherein the second plurality of optical gratings integrally defined in the second surface includes a diffraction grating.

5. The vehicle light assembly of claim 3, wherein the first plurality of optical gratings integrally defined in the first surface includes a holographic grating.

6. The vehicle light assembly of claim 1, wherein the optical grating is at least one of a holographic grating and a diffraction grating.

7. The vehicle light assembly of claim 6, wherein the optical grating comprises a holographic grating.

8. The vehicle light assembly of claim 7, wherein the holographic grating is configured to produce a projected image.

9. The vehicle light assembly of claim 7, wherein the optical grating comprises a diffraction grating.

10. The vehicle light assembly of claim 1, wherein the light source is a headlamp light source.

11. A vehicle headlight assembly, comprising:
a housing;
a headlamp light source positioned within the housing;
a substantially transparent lens coupled with the housing extending over the light source, wherein the lens defines an interior surface and an exterior surface; and
a first plurality of optical gratings comprising at least one of a diffraction grating and a holographic grating integrally defined in the interior surface in a spaced apart configuration; and
a second plurality of optical gratings comprising at least one of a diffraction grating and a holographic grating defined in the exterior surface in a spaced-apart configuration, wherein each of the second plurality of optical gratings is free of overlap with the first plurality of optical gratings.

12. The vehicle headlight assembly of claim 11, wherein the substantially transparent lens comprises polycarbonate.

13. The vehicle headlight assembly of claim 11, wherein at least one of the first and second pluralities of optical gratings defines an indicia, and wherein each of the first plurality of optical gratings is disposed between adjacent optical gratings of the second plurality of optical gratings.

14. A method of producing a vehicle light assembly, comprising the steps:
forming a housing;
injection molding a substantially transparent polymer into a mold defining a first plurality of optical grating features having different periods in a spaced apart configuration and a second plurality of optical grating features in a spaced apart configuration and free of overlap with the first plurality of optical gratings;
solidifying the polymer in the plurality of optical grating features to form a lens defining first and second pluralities of optical gratings having varying periods on first and second surfaces; and
coupling the lens to the housing.

15. The method of claim 14, further comprising the step:
inserting a headlamp light source into the housing.

16. The method of claim 14, further comprising the step of:

forming at least one of the first and second pluralities of optical grating features of the mold as a holographic grating.

17. The method of claim 14, further comprising the step of:

forming at least one of the first and second pluralities of optical grating features of the mold as a diffraction grating.

18. The method of claim 14, further comprising the step of:

forming at least one of the first and second pluralities of optical grating features using a femtosecond laser.

19. The method of claim 14, wherein the step of solidifying the polymer in the first and second pluralities of optical grating features to form the lens defining the first and second pluralities of optical gratings on a surface further comprises:

forming the first and second pluralities of optical gratings as an indicia.

20. The method of claim 14, wherein the step of injection molding the substantially transparent polymer into the mold defining the first and second pluralities of optical grating features further comprises:

heating the mold proximate the first and second pluralities of optical grating features.

\* \* \* \* \*